US010073992B2

(12) United States Patent
Jones et al.

(10) Patent No.: US 10,073,992 B2
(45) Date of Patent: Sep. 11, 2018

(54) METHOD AND APPARATUS PERTAINING TO FACILITATING THE READING OF RFID TAGS

(71) Applicant: Wal-Mart Stores, Inc., Bentonville, AR (US)

(72) Inventors: Nicholaus A. Jones, Fayetteville, AR (US); Jarrod Lee Bourlon, Centerton, AR (US); Alvin Scott Taulbee, Springdale, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 454 days.

(21) Appl. No.: 14/032,560

(22) Filed: Sep. 20, 2013

(65) Prior Publication Data

US 2015/0084746 A1 Mar. 26, 2015

(51) Int. Cl.
*G06K 7/10* (2006.01)
*G06K 7/00* (2006.01)

(52) U.S. Cl.
CPC ....... *G06K 7/10009* (2013.01); *G06K 7/0008* (2013.01); *G06K 7/10366* (2013.01)

(58) Field of Classification Search
CPC ............... G06K 19/0723; G06K 19/18; G06K 2017/0064; G06K 7/0008; G06K 7/10009;

(Continued)

(56) References Cited

U.S. PATENT DOCUMENTS 5,850,187 A 12/1998 Carrender
6,078,251 A 6/2000 Landt
(Continued)

FOREIGN PATENT DOCUMENTS

CA 2805742 1/2012
JP 2006127034 5/2006
(Continued)

OTHER PUBLICATIONS

EPCGLOBAL; 'EPC(TM) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

(Continued)

*Primary Examiner* — Emily C Terrell
(74) *Attorney, Agent, or Firm* — Fitch, Even, Tabin & Flannery LLP

(57) ABSTRACT

These teachings generally comprise interrogating RFID tags and receiving corresponding responses from various ones of these RFID tags while also receiving, from a remote source, surrogate response corresponding to at least some of the plurality of RFID tags that are not responding to the current interrogation. A corresponding plurality of end user-perceivable indications as correspond to both the responses from various ones of the plurality of RFID tags and the aforementioned surrogate responses are then provided to thereby ultimately inform an end user of the RFID tag reader with respect to a corresponding reading state as regards the plurality of RFID tags.

17 Claims, 3 Drawing Sheets

(58) Field of Classification Search
CPC .. G06K 7/10049; H04L 2209/805; H04L 9/32
USPC .................................. 340/10.32, 10.33, 10.3
See application file for complete search history.

(56) References Cited

U.S. PATENT DOCUMENTS

| | | | |
|---|---|---|---|
| 6,232,870 B1* | 5/2001 | Garber et al. ................. | 235/385 |
| 6,335,686 B1* | 1/2002 | Goff et al. ................. | 340/572.4 |
| 6,354,493 B1 | 3/2002 | Mon | |
| 6,420,961 B1 | 7/2002 | Bates | |
| 6,677,852 B1 | 1/2004 | Landt | |
| 7,187,288 B2 | 3/2007 | Mendolia | |
| 7,205,896 B2 | 4/2007 | Wu | |
| 7,528,726 B2 | 5/2009 | Lee | |
| 7,598,875 B2 | 10/2009 | Noguchi | |
| 1,387,560 A1 | 5/2013 | Jones | |
| 2001/0008390 A1 | 7/2001 | Berquist | |
| 2005/0093698 A1* | 5/2005 | Sakamoto ............ | G06K 7/0008 340/572.1 |
| 2006/0043179 A1 | 3/2006 | Nycz | |
| 2006/0047789 A1 | 3/2006 | Kumar | |
| 2006/0049249 A1* | 3/2006 | Sullivan ............... | G06K 7/0008 235/385 |
| 2006/0208859 A1 | 9/2006 | Hougen | |
| 2008/0231426 A1 | 9/2008 | Kamel | |
| 2008/0249899 A1* | 10/2008 | Nasser ............. | 705/28 |
| 2010/0079245 A1 | 4/2010 | Perng | |
| 2011/0025462 A1* | 2/2011 | Stern ................... | G06K 7/0008 340/10.1 |
| 2012/0013440 A1 | 1/2012 | vonBose | |
| 2012/0013441 A1 | 1/2012 | Ulrich | |
| 2012/0086554 A1 | 4/2012 | Wilkinson | |
| 2012/0161939 A1 | 6/2012 | Posamentier | |
| 2012/0223817 A1* | 9/2012 | Hansen ................... | G07C 1/24 340/10.33 |
| 2012/0274449 A1 | 11/2012 | Wilkinson | |

FOREIGN PATENT DOCUMENTS

| | | |
|---|---|---|
| KR | 100669222 | 1/2007 |
| KR | 1020090019219 | 2/2009 |
| WO | 2012009692 | 1/2012 |
| WO | 2012009694 | 1/2012 |

OTHER PUBLICATIONS

PCT; App. No. PCT/US2011/044274; International Preliminary Report on Patentability dated Jan. 31, 2013.
PCT; App. No. PCT/US2011/044274; International Search Report dated Feb. 20, 2012.
PCT; App. No. PCT/US2011/044274; Written Opinion dated Feb. 20, 2012.
USPTO; U.S. Appl. No. 12/844,449; Office Action dated Apr. 30, 2013.
USPTO; U.S. Appl. No. 12/844,499; Office Action dated Sep. 20, 2013.
PCT; App. No. PCT/US2014/055756; International Search Report dated Dec. 12, 2014.
PCT; App. No. PCT/US2014/055756; Written Opinion dated Dec. 12, 2014.
USPTO; U.S. Appl. No. 13/875,608; Office Action dated Apr. 9, 2015.

* cited by examiner

METHOD AND APPARATUS PERTAINING TO FACILITATING THE READING OF RFID TAGS

TECHNICAL FIELD

This invention relates generally to the reading of Radio Frequency Identification (RFID) tags.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have an utterly-unique serial number (within the EPC system) to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference.)

Being able to read and then uniquely identify each item within a manufacturing facility, a cargo container, a staging area, or in a retail display area offers any number of useful opportunities. Unfortunately, the very nature of RFID-based technology, coupled with a correspondingly potentially enormous number of individually-tagged items, also gives rise to a number of challenges as well. As one simple example in these regards, an end user employing a handheld RFID tag reader may often be uncertain when they are, in fact, "done" with reading a given plurality of RFID tags.

An associate on the floor of a large retail-sales facility, for example, will not typically know just how many RFID tags are, in fact, to be read during a particular reading exercise. This problem exists, at least in part, because there is nothing inherent or intrinsic about the EPC GEN2 coding scheme (or its functional counterparts) and/or its corresponding reading protocol that identifies when all RFID tags that are to be read have been read.

The aforementioned problem is further acerbated by at least some RFID-tag protocols that permit an RFID tag to have any of a plurality of read states. The aforementioned EPC GEN2 approach, for example, provides for a so-called A inventory state and a B inventory state. This permits, for example, a group of RFID tags to be inventoried without necessarily requiring each and every RFID tag to respond to the reader. A reader can be configured, for example, to request that RFID tags having an A inventory state respond to a read request while permitting RFID tags having a B inventory state to essentially ignore the read request. Generally speaking, the "A" state comprises a default state and hence represents the tag's state when initially powering up. Once a tag has been read its read state changes from "A" to "B."

The EPC GEN2 standard specifies four different sessions that provide for differences with respect to how a read tag persists a "B" state. In Session "0" a read tag will persist this "B" state until power is lost and then the tag reverts immediately to the "A" state. In Session "1" a read tag will persist its "B" state for a period of time ranging from 500 ms to 5 seconds and will then automatically revert to the "A" state. In Session "2" and "3" a read tag will remain in the "B" state until power is lost. Then, once power is lost, the read tag will persist its "B" state for at least an additional 2 seconds (the actual persistence duration is left to the manufacturer and can reach minutes in some cases).

Accordingly, an associate who seeks to conduct an RFID tag-based inventory of a modular of tagged items can be further confused or even mislead when the number of reads is considerably less than what the associate's eyes see. In particular, a given modular of items having an obviously considerable number of tagged items may nevertheless yield only a few current reads when many of the tagged items are presently in the "B" state due to a previous read.

BRIEF DESCRIPTION OF THE DRAWINGS

The above needs are at least partially met through provision of the method and apparatus pertaining to facilitating the reading of RFID tags described in the following detailed description, particularly when studied in conjunction with the drawings, wherein.

Figure 1:
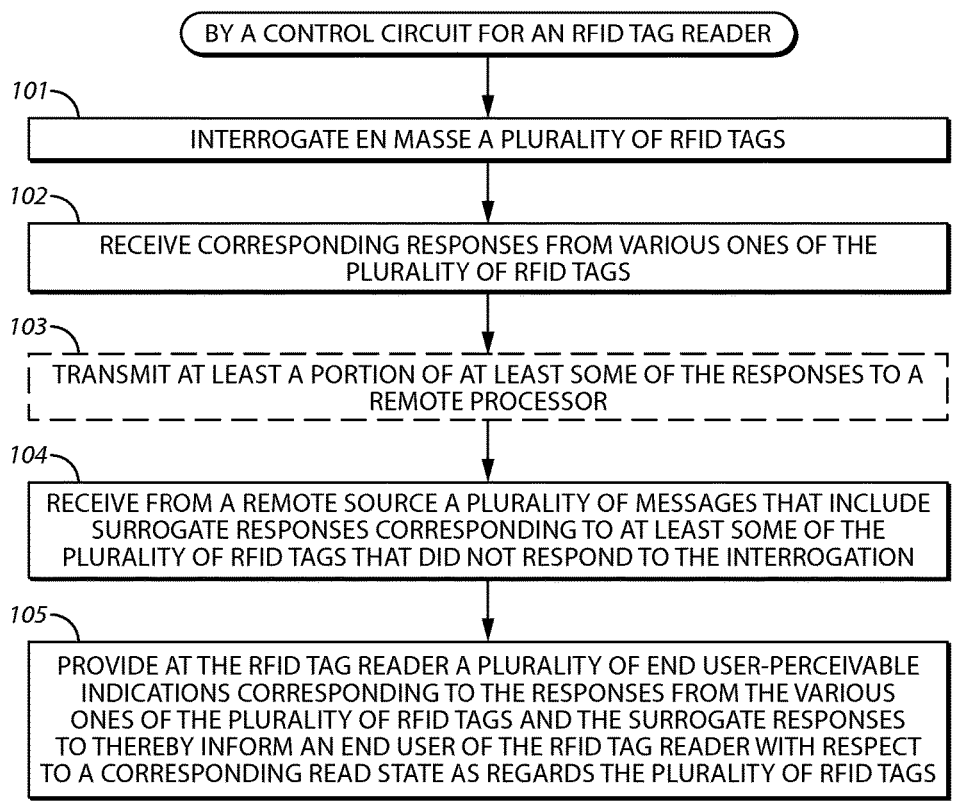
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments are employed in conjunction with an RFID tag reader when reading a plurality of RFID tags. These teachings generally comprise interrogating these RFID tags and receiving corresponding responses from various ones of these RFID tags while also receiving, from a remote source, surrogate response corresponding to at least some of the plurality of RFID tags that are not responding to the current interrogation. A corresponding plurality of end user-perceivable indications as correspond to both the responses from various ones of the plurality of RFID tags and the aforementioned surrogate responses are then provided to thereby ultimately inform an end user of the RFID tag reader with respect to a corresponding reading state as regards the plurality of RFID tags.

By one approach the foregoing can comprise transmitting at least a portion of at least some of the responses to the remote processor and receiving from that remote process a plurality of messages that includes the aforementioned surrogate responses.

These teachings will accommodate a wide range of end user-perceivable indications. By one approach, for example, these indications can each comprise an audible sound. As another example, these indications can be visual and might comprise, for example, light flashes. As yet another example, these indications can comprise haptic sensations (imparted, for example, by use of a vibratory mechanism). And, of course, these teachings will readily accommodate combining two or more of these different modalities to provide a multi-modality end-user perceivable indication.

By one approach the same end user-perceivable indication serves regardless of whether indicating a response from one of the plurality of RFID tags or a surrogate response. By another approach, if desired, the end user-perceivable indication is different depending upon whether the indication corresponds to a response from one of the plurality of RFID tags or a surrogate response. For example, these teachings can use a first sound to denote responses from the RFID tags on the one hand and a second sound (that is different from the first sound) to denote surrogate responses.

So configured, an associate conducting, for example, a modular-by-modular inventory using a handheld RFID reader can receive useful, non-confusing feedback regarding the relative completeness of a local portion of that inventory even when some or even most of the relevant RFID tags are not responding for having already responded to an earlier read and then having assumed a read state that dictates their present silence.

These teachings are highly scalable and can be employed in conjunction with as few, or as many, RFID tags and/or segregated read activities as one might wish. These teachings are also highly flexible in that they can be successfully employed in a wide variety of application settings and with essentially any version or form factor of RFID tag. It will also be appreciated that these teachings can be readily implemented in highly cost-effective ways.

These and other benefits may become clearer upon making a thorough review and study of the following detailed description. Referring now to the drawings, and in particular to FIG. 1, an illustrative process 100 that is compatible with many of these teachings will now be presented. For the sake of illustration it is presumed here that a control circuit of choice carries out this process 100.

Figure 2:
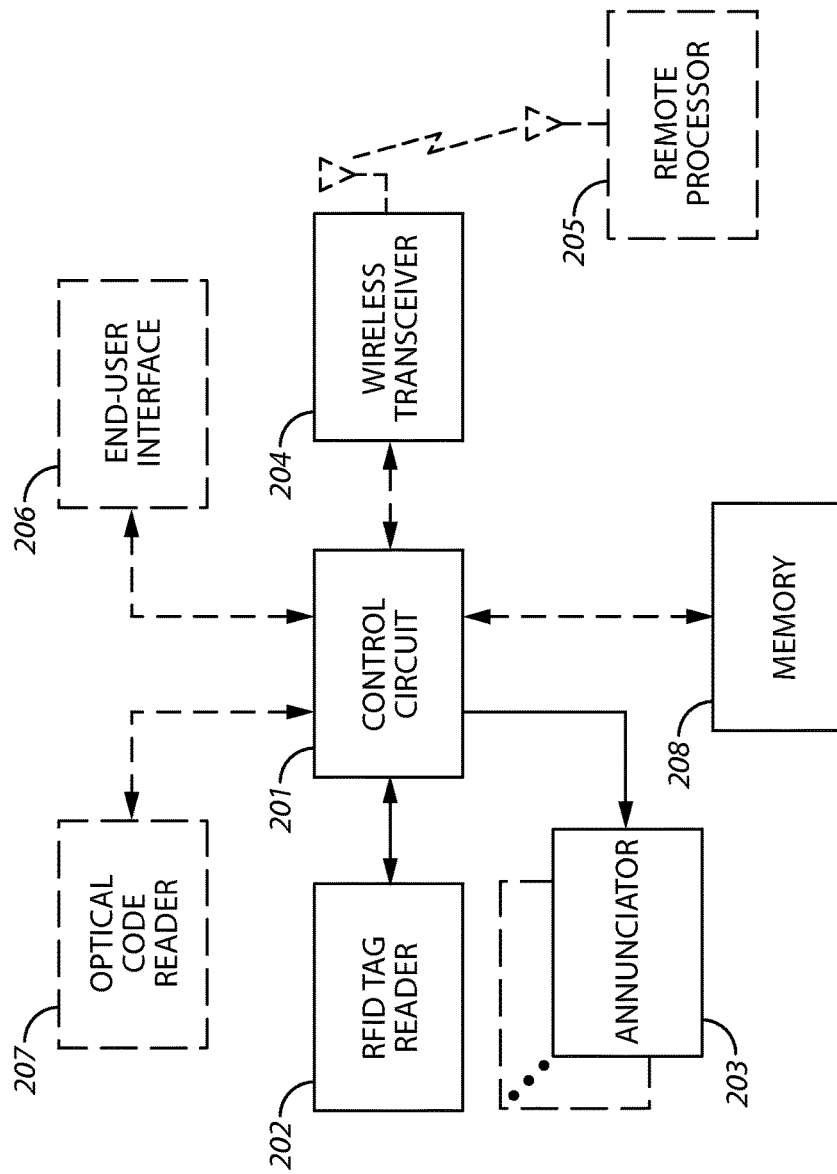
FIG. 2 comprises a block diagram as configured in accordance with various embodiments of the invention.

FIG. 2 provides an illustrative example in these regards. In this illustrative example the end-user platform 200 comprises a control circuit 201 that operably couples to an RFID tag reader 202 and one or more annunciators 203. Such a control circuit 201 can comprise a fixed-purpose hard-wired platform or can comprise a partially or wholly programmable platform. All of these architectural options are well known and understood in the art and require no further description here. This control circuit 201 is configured (using, for example, ordinary programming approaches as are known in the art) to carry out one or more of the steps, actions, and/or functions described herein.

The annunciator 203 can comprise any of a variety of annunciators as are known in the art. This can include, as suggested above, audible indicators, visual indicators, and/or haptic indicators.

This end-user platform 200 can further comprises a wireless transceiver 204 of choice. This wireless transceiver 204 can operably couple to the control circuit 201 and can serve to permit the latter to communicate with one or more remote processors 205. In such a case, the remote processor(s) 205 can themselves be configured to carry out at least one of the steps, actions, and/or functions described herein. (If desired, one could also employ a non-wireless transceiver for such purposes, either in lieu of the wireless transceiver 204 or in combination therewith.)

For many application settings it will be useful for the end-user platform 200 to further include an optional end-user interface 206 that operably couples to the control circuit 201 (and/or to other components such as the RFID tag reader 202 as desired). This end-user interface 206, by one approach, can serve to permit the end user to prompt, control, and otherwise direct at least some of the operability states of the platform 200. For example, the end-user interface 206 can include a trigger-styled switch that, when asserted by the end user, will cause the RFID tag reader 202 to transmit RFID tag interrogation signals and to receive corresponding responses. As another simple example in these regards, this end-user interface 206 can include a potentiometer-styled controller that permits the end user to control the volume of an audible annunciator 203. As yet another example, the end-user interface 206 could comprise a virtual button presented on a touchscreen, or could even comprise a particular gesture on a touchscreen that uniquely serves in these regards.

By another approach, in combination with the foregoing or in lieu thereof, this end-user interface 206 can provide informational output to the end user. As one simple example, the end-user interface 206 can include a pilot light to indicate when the platform 200 is powered on. As another simple example, the end-user interface 206 can comprise an active display (such as a liquid crystal display) that provides a current count of the number of RFID tags that have been read or for which the platform 200 has provided an annunciation or surrogate response during a current en masse interrogation.

The above examples are intended to serve an illustrative purpose and are not intended, by their specificity, to suggest any particular limitations in these regards.

These teachings will readily accommodate numerous other optional modifications as desired. As one example in these regards, the end-user platform 200 can further comprise an optical code reader 207 that operably couples to the control circuit 201. This optical code reader 207, for example, can comprise a bar code reader. Such an accommodation will permit the platform 200 to read, for example, standard Universal Product Codes (UPC's) in addition to EPC's.

As another example in these regards, the end-user platform 200 can further comprise memory 208 that operably couples to the control circuit 201. This memory 208 can serve to store, for example, historical RFID tag data or presently-read data. Such a memory 208 can also serve to store, as another example, computer operating instructions that, when executed by the control circuit 201, will permit the latter to carry out the steps, actions, and/or functions described herein.

For many applications settings this end-user platform 200 can comprise a portable device having its own portable power supply (such as one or more batteries). It would also be possible for this platform 200, however, to couple via a power cord to a source of enabling power (such as a standard electrical power outlet).

Such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Referring now again to FIG. 1, at step 101 of this process 100 the control circuit 201 employs the RFID tag reader 202 to interrogate a plurality of RFID tags. In a typical application setting employing passive RFID tags, this comprises transmitting a radio frequency signal having a particular frequency (such as, for example, a relatively-low frequency (such as 125 kHz), a relatively-high frequency (such as 13.56 MHz), a relatively-ultrahigh frequency (such as 900 MHz), or a relatively-extremely high frequency (such as 2.4 GHz)) to the tags. This received signal provides energy that powers the tag control circuit 201. This circuitry, upon recognizing a need to respond to the interrogation, then modulates the signal to provide corresponding responsive data.

Generally speaking, each of these RFID tags will be attached to (or comprise a part of) a given item (or the packaging for that item) such as an item being offered for retail sale. (It will therefore be understood that a given such "item" may comprise a plurality of related physically-discrete components. For example, the "item" may comprise a box of cookware that contains two pots with two corresponding lids along with a frying pan.)

Also generally speaking, in many application settings this interrogation step 101 will correspond to a relatively limited physical area. Examples include, but are not limited to, a given display shelf or a plurality of shelves as comprise a given display, a so-called end-cap display, a given display rack or a plurality of display racks in a limited area (such as an area of 100 square feet, 150 square feet, 200 square feet, and so forth). In such an application setting, the end user will typically be initiating their RFID tag reader to begin reading the RFID tags within the coverage area of their RFID tag reader with the intention of eventually concluding that read and then moving on to begin a new interrogation step. (These teachings will also accommodate, however, simply leaving the reader in a constantly interrogating state while reading and processing RFID tags as per the remainder of this process and while moving from one area to another.)

Accordingly, if desired, this interrogation step 101 can comprise interrogating en masse the aforementioned plurality of RFID tags. As used herein, this expression "interrogating en masse" refers to interrogating a plurality of RFID tags in a setting where the proximity of the RFID tags to one another is sufficiently close that interrogation by the RFID tag reader will generate a plurality of largely contemporaneous interrogation responses from these various RFID tags such that response prioritization, re-transmission, and/or collision remediation aspects of the RFID-signaling protocol being employed are likely utilized in order to permit each of the interrogated RFID tags to successfully respond to the interrogation.

In any event, at step 102 this process 100 provides for receiving corresponding responses from various ones of the plurality of RFID tags. The specific nature of these responses will of course vary depending upon the particular RFID coding scheme being used. For the sake of illustration but without intending any particular limitations in these regards, it will be presumed here that the RFID coding scheme is compatible with an EPCGlobal-based EPC coding scheme. Accordingly, each response will typically include a unique serial code and such information as a SKU number for the item that corresponds to the RFID tag.

The interrogation and receipt of RFID responses, as well as the structure and content of such responses, comprises a well-understood area of endeavor. Furthermore, these teachings are not particularly sensitive to the selection of any particular approaches in these regards. Accordingly, for the sake of brevity, further elaboration in these regards will not be provided here.

By one approach, and as illustrated in FIG. 2, the RFID tag reader 202 comprises a part of an integrated end-user platform 200 that includes additional structure and/or programming to carry out the described activity. The end-user platform 200 also communicates with one or more remote processors 205. To facilitate such an approach, these teachings will accommodate the optional step 103 of transmitting at least a portion of at least some of the aforementioned interrogation responses to the remote processor 205 and the corresponding step 104 of receiving a plurality of corresponding messages from the remote processor 205.

In a typical application setting the aforementioned wireless transceiver 204 can communicate with such a remote processor 205 (or processors, as desired) via any of a variety of enabling approaches. Non-limiting illustrations in these regards are infrared-based communications, Bluetooth™-compatible communications, IEEE 802.11-compatible communications, wide-area communications (such as any of a variety of cellular telephony-based communications), and so forth.

As will be described below in more detail, by one approach these messages from the remote source 205 can correspond to RFID tags that responded to the current interrogation 101. In combination with such content, or in lieu thereof, these teachings also provide for having those messages include content corresponding to surrogate responses for RFID tags that did not respond to the current interrogation 101 because of their read state.

To be clear, this example presumes the use of RFID tags having a plurality of possible read states such as the so-called inventory states "A" and "B" of the EPC GEN2 standard. In a typical operating configuration an RFID tag in read state "B" will not respond to an RFID tag reader's interrogation notwithstanding that the RFID tag is receiving the interrogation signal, is powered up, and is otherwise capable of responding to the interrogation but for that read state. The RFID tag, in turn, assumes read state "B" after having responded to an interrogation while in read state "A."

Figure 3:
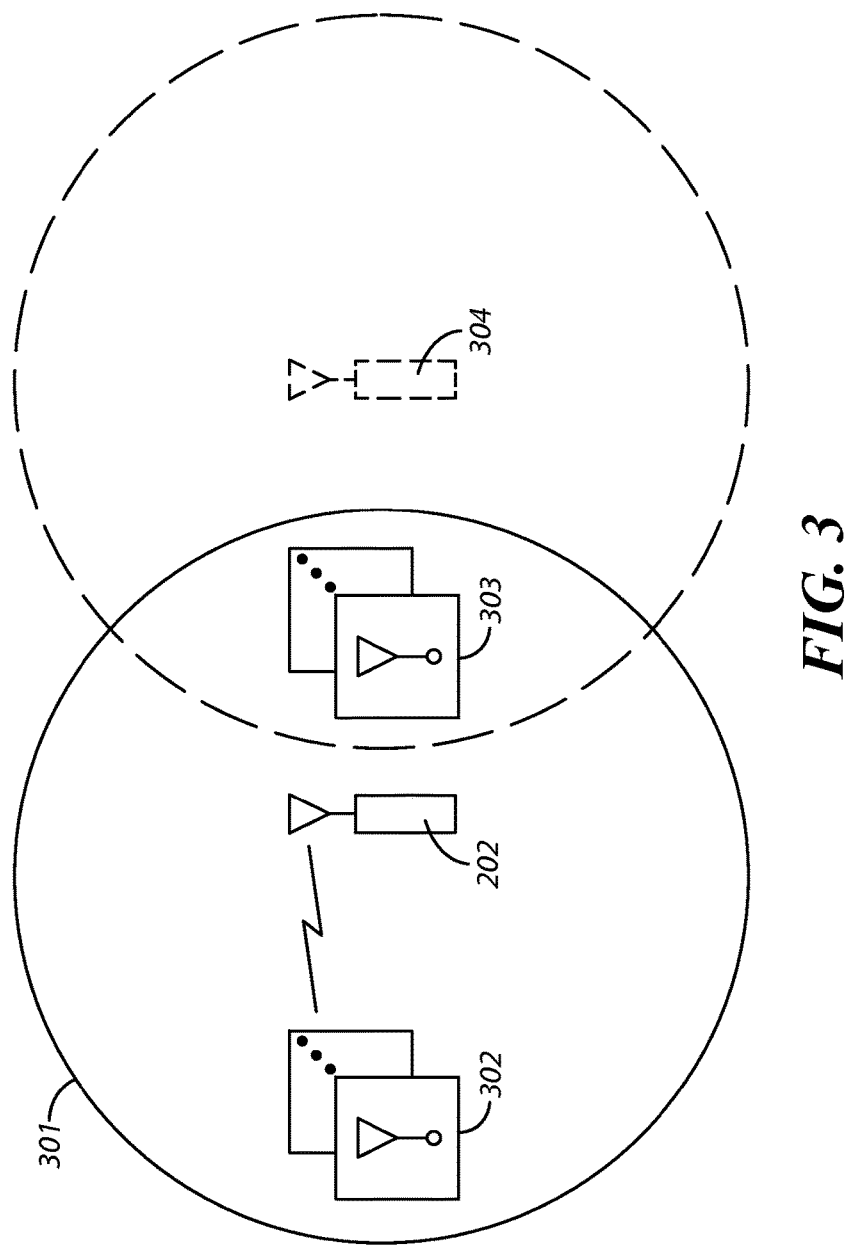
FIG. 3 comprises a block diagram as configured in accordance with various embodiments of the invention.

FIG. 3 provides a simple example in these regards. In this example an RFID tag reader 202 as described above transmits an interrogation signal within the corresponding coverage zone 301 of the RFID tag reader 202. RFID tags 302 within that coverage zone 301 that are presently in read state "A" and that sufficiently receive the interrogation signal will respond to the interrogation signal by transmitting a corresponding response to the RFID tag reader 202.

Other RFID tags 303 within that coverage zone 301 that sufficiently receive the interrogation signal, however, do not respond to the interrogation signal as these RFID tags 303 are in read state "B." In this example these "B"-state RFID tags 303 responded to a previous interrogation from an RFID tag reader identified here by reference numeral 304 and hence assumed their present "B" state.

By one approach that RFID tag reader 304 is a different RFID tag reader than the present RFID tag reader 202. (These teachings will also readily accommodate a plurality of different RFID tag readers in these regards.) These teachings are not limited to that use case, however. For example, that RFID tag reader 304 can be the same RFID tag reader as the present RFID tag reader 202. Such a situation can arise, for example, when that RFID tag reader 202 is used previously to conduct another inventory.

With the foregoing in mind as a useful illustrative example, the aforementioned surrogate responses are, in substance and effect, content provided to the control circuit 201 as though the "B"-state silent RFID tags 303 had, in fact, responded to the RFID tag reader's 202 current interrogation.

The remote processor 205 provides these surrogate responses in this illustrative example. By one approach these surrogate responses are provided as a function, at least in part, of the responses that the RFID tag reader 202 currently receives and then transmits as per block 103 described above. The information contained in those responses can serve, for example, to determine a present location of the RFID tag reader 202 in the facility. That location, in turn, can be used to determine the RFID tags 303 at that same location for which a response was received pursuant to a previous interrogation.

These teachings will accommodate other approaches in these regards. For example, direct (or indirect) input from the user can directly or indirectly identify a present location of the RFID tag reader 202. As another example, in lieu of the foregoing or in combination therewith, any of a variety of video analytics, Wi-Fi-based location determination, or location-dedicated tags could serve in these regards.

These teachings will also accommodate a use of time in these same regards if desired. Time, for example, can help to define and/or constrain windows during which the relevance of incoming reads can be assessed. One could, by way of example, only consider tag responses that arrive within, say, a most recent five minute or ten minute window when sending surrogate information as per these teachings. Accordingly, the control circuit can provide the plurality of end user-perceivable indications corresponding to the responses from the various ones of the plurality of RFID tags and the surrogate responses by providing the plurality of end user-perceivable indications as a function, at least in part, of filtering less-recent reads to identify relevant more-recent reads.

In any event, at step 105 this process 100 provides, at the RFID tag reader, a plurality of end user-perceivable indications corresponding to the responses from the various ones of the plurality of RFID tags as well as the surrogate responses. These end user-perceivable indications in turn serve to inform an end user of the RFID tag reader with respect to a corresponding reading state as regards the plurality of RFID tags. In the case of the surrogate responses, of course, the end user-perceivable indication represents a surrogate reading state as the actual reading state for such RFID tags is a non-responsive reading state. An illustrative but not necessarily limiting list of such reading states can comprise:

(a) actively reading a number of RFID tags with more tags likely remaining to be read in this plurality of RFID tags;

(b) actively reading some remaining RFID tags but the read process for this plurality of RFID tags is nearing completion;

(c) actively reading one or more remaining RFID tags but the read process for this plurality of RFID tags may now be complete;

(d) there do not appear to be any further RFID tags in this plurality of RFID tags to read.

If desired, this process 100 will accommodate filtering the interrogation responses to more selectively provide the aforementioned end user-perceivable indications. This filtering, when utilized, can be effected by the end-user platform or, if desired, can be effected in whole or in part by the aforementioned remote processor(s). As one example in these regards, this tag filtering process can provide for determining if a currently-read RFID tag is an RFID tag of interest. By one approach, this can comprise comparing information in the RFID response with one or more identifiers. As an illustrative example in these regards, and without intending any corresponding limitations, such an identifier might comprise a stock-keeping unit (SKU) number of interest. In such a case, only RFID tag responses that convey that particular SKU number will be accepted and other responses will be discarded.

Regardless of how filtered, pursuant to such an approach only those RFID tags that pass the filtering criterion (or criteria, as desired) are then used to support informing the end user. In the specific example illustrated, this will comprise only RFID tags that are newly read pursuant to this round of interrogation and, optionally, that also match in some predefined manner one or more previously-established identifiers. More specifically, when using this approach, only RFID tags that pass the filtering criteria will be used to prompt the provision of the aforementioned end user-perceivable indications.

The specific end user-perceivable indications provided can be audible if desired. For example, short chirps, pops, clicks, or the like can serve in these regards, in which case the indications can all be essentially audibly identical to one another. If desired, slightly or significantly different sounds can be employed to help the end user distinguish between them. As a simple example in these regards, short tones having a frequency of 600 Hz and 900 Hz could be used in an alternating manner if desired.

These sounds can be rendered using any of a variety of known approaches including but not limited to synthesizing the sounds, playing back a pre-recorded sound, and so forth. Generally speaking, for many application settings it will serve well if these individual audible sounds are relatively short (such as, for example, no longer than about 300 milliseconds in duration, or 200 milliseconds in duration, or 100 milliseconds in duration, as desired). This can be helpful when reading dozens or even hundreds or thousands of RFID tags during a single interrogation activity.

Depending upon the nature of the audible sound (such as, for example, it's amplitude envelope) it may be useful to prevent any overlap between temporally adjacent audibilizations (to thereby help the end user to distinguish one indication from another). In such a case, a minimum period of silence between such audibilizations may be specified, such as a minimum of 20 milliseconds, 50 milliseconds, 100 milliseconds, or the like.

In other cases it may be acceptable to permit the individual audible indications to overlap somewhat with one another. Here, however, it may be useful to limit the amount of overlap to no more than some maximum amount. For example, the amount of temporal overlap may be limited to no more than about five percent, ten percent, or twenty-five percent of the total duration of the indication as desired.

When using an audible indicator, these teachings will accommodate providing a plurality of different audible indicators to thereby permit a given end user to select a particular favored indicator. This can permit a given end user, for example, to select an audible indicator having a pitch/frequency that is readily perceived by that particular end user.

In lieu of an audible indicator, or in combination therewith, these teachings will also accommodate using a visually-perceivable indicator if desired. This can comprise, for example, flashing/strobing a light-emitting diode or incandescent bulb having a desired color. This could also comprise, if desired, providing a particular animated graphic on an active full-color or monochromatic display. Numerous other possibilities of course exist in these regards. So configured, an end user with a partial or complete hearing disability can still make satisfactory use of these teachings. Such an approach will also accommodate the challenges presented by a particularly noisy application setting (such as a factory floor, loading dock, or the like). Using a visually-perceivable indicator instead of an audible indicator may also be preferred when reading RFID tags in a retail setting during business hours to thereby avoid distracting, confusing, or irritating shoppers.

Further in lieu of the foregoing, or again in combination with either or both an audible or visual indicator, the end user-perceivable indication can comprise a haptically-based indication. This might comprise, for example, a short vibration that the end user perceives through their hand when holding the RFID tag reader during the interrogation process. (Various vibratory mechanisms are known in the art and find application, for example, in cellular telephones and video-game controllers. Accordingly, no further description regarding such mechanisms need be provided here.)

If desired, these teachings will support using different indications (such as different sounds) to differentiate between current interrogation responses and the aforementioned surrogate responses. By one approach, the aforementioned end-user interface 206 permits the user to select between the use of a same sound for both kinds of responses and different sounds to differentiate between these two kinds of response.

These teachings will support, if desired, providing the aforementioned end user-perceivable indications to the end user at a rate that varies over the course of reading the plurality of RFID tags. This, for example, can serve to indicate to the end user information regarding the various read states described above. At the beginning of an interrogation session the individual end user-perceivable indications can be temporally dense (and are possibly being provided as fast as possible subject to whatever overlap/separation requirements may be mandated). In a later portion of the interrogation session, however, the individual end user-perceivable indications are spaced further apart. In this particular example, the spacing between individual end user-perceivable indications in fact grows larger at time passes.

Such a presentation strategy not only provides the end user with an affirmative and positive indication of read events but also serves to provide the end user with a strong, intuitive understanding regarding when all available RFID tags of interest have been read. In particular, a rapid presentation of read indicators that gradually winds down as the temporal separation between subsequent indicators grows provides an easily-perceived and intuitively grasped understanding regarding when the read process for a particular plurality of RFID tags is complete. This, in turn, permits the end user to move on with confidence to a next area where RFID tags are to be similarly read.

In some cases, as when the RFID signaling protocol and/or received-data processing is sufficiently slow, such a result can accrue by providing such indications substantially in real-time with respect to when the corresponding responses were received (or as offset by some small amount such as a few (or a few dozen) milliseconds). In other cases, and particularly when the system can process a large number of responses in a short period of time (such as, for example, 50 responses per second or more), it may be useful to artificially provide the corresponding indicators in the manner described above. For example, in an application setting where the system can interrogate, receive, and process 200 RFID tags in less than two seconds, it may nevertheless be helpful to provide the end user-perceivable indications in the above-described manner over the course of, say, five or ten seconds. This will permit the end user, for example, to actually have the cognitive opportunity to sense and detect the slowing down of the indicators and hence to better intuitively sense when the reading process concludes.

If desired, this process 100 will also optionally accommodate providing at the RFID tag reader an end user-perceivable indication that is different than the above-noted indications to uniquely and specifically signal when interrogation of the plurality of RFID tags is complete. Such an indication will typically follow the aforementioned plurality of end user-perceivable indications. This indication can be based, for example, upon detecting that a predetermined amount of time (such as one second, two seconds, five seconds, or the like) has passed without the RFID tag reader having receiving an interrogation response from an RFID tag of interest and without having received a surrogate response.

So configured, these teachings will readily facilitate the convenient, efficient, and reliable reading of various pluralities of RFID tags in settings where the number of RFID tags is not necessarily well understood and/or where the end user is not a highly-trained technician. In particular, these teachings can help to derive useful results even in operating environments where some of the RFID tags of interest are non-responsive to present interrogations as a result of previous interrogations. These benefits, in turn, permit these teachings to be employed in highly cost-effective ways that can lead to reduced overhead expenditures. These savings, in turn, can then be passed along to the ultimate consumer.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method to facilitate an end user reading a plurality of radio frequency identification (RFID) tags using an RFID tag reader, the method comprising:
   interrogating en masse the plurality of RFID tags;
   receiving corresponding responses from various ones of the plurality of RFID tags;
   receiving from a remote source surrogate responses corresponding to at least some of the plurality of RFID tags that did not respond to the interrogation but which did respond to a previous interrogation, the surrogate responses comprising content as though the RFID tags that did not respond to the interrogation had in fact responded to the interrogation;

providing at the RFID tag reader a plurality of end user-perceivable indications corresponding to the responses from the various ones of the plurality of RFID tags and the surrogate responses to thereby inform an end user of the RFID tag reader with respect to a corresponding read state as regards the plurality of RFID tags.

2. The method of claim 1 further comprising:
while receiving the responses:
transmitting at least a portion of at least some of the responses to a remote processor;
receiving from the remote processor a plurality of messages that includes the surrogate responses;
and wherein providing at the RFID tag reader a plurality of end user-perceivable indications corresponding to the responses from the various ones of the plurality of RFID tags and the surrogate responses comprises providing the plurality of end user-perceivable indications as a function of the messages.

3. The method of claim 1 wherein providing the plurality of end user-perceivable indications corresponding to the responses from the various ones of the plurality of RFID tags and the surrogate responses comprises using a first sound to denote responses from the various ones of the plurality of RFID tags and a second sound that is different from the first sound to denote the surrogate responses.

4. The method of claim 1 wherein receiving corresponding responses from various ones of the plurality of RFID tags comprises not receiving corresponding responses from at least some previously-read RFID tags, and wherein receiving from a remote source surrogate responses corresponding to at least some of the plurality of RFID tags that did not respond to the interrogation comprises receiving surrogate responses for at least some of the previously-read RFID tags.

5. The method of claim 4 wherein the previously-read RFID tags were read by at least one different RFID tag reader.

6. The method of claim 1 wherein the end user-perceivable indications are identical to one another.

7. The method of claim 1 wherein the end user-perceivable indications are each no longer than 200 milliseconds in duration.

8. The method of claim 1 wherein providing at the RFID tag reader a plurality of end user-perceivable indications corresponding to the responses from the various ones of the plurality of RFID tags and the surrogate responses comprises providing the end user-perceivable indications in real-time with respect to when the corresponding responses and the surrogate responses are received.

9. The method of claim 1 wherein at least one of the surrogate responses corresponds to an RFID tag that the RFID tag reader read previously.

10. An apparatus to facilitate reading a plurality of radio frequency identification (RFID) tags, the apparatus comprising:
an RFID tag reader configured to interrogate the plurality of RFID tags and to receive corresponding responses from various ones of the plurality of RFID tags;
a receiver configured to receive surrogate responses for non-responding RFID tags that did respond to a previous interrogation, the surrogate responses comprising content as though the non-responding RFID tags had in fact responded to the interrogation;
an annunciator configured to provide end user-perceivable indications;
a control circuit operably coupled to the annunciator and the receiver and configured to provide a plurality of end user-perceivable indications corresponding to the responses from the various ones of the plurality of RFID tags and the surrogate responses to thereby inform an end user of the apparatus with respect to a completeness level of the reading of the plurality of RFID tags, wherein the completeness level treats the non-responding RFID tags for which the surrogate responses were received as though the non-responding RFID tags had responded.

11. The apparatus of claim 10 further comprising:
a transmitter operably coupled to the control circuit;
and wherein the control circuit is configured to, while receiving the responses:
transmit at least a portion of at least some of the responses to a remote processor;
receive from the remote processor a plurality of messages that includes the surrogate responses;
and wherein the control circuit is configured to provide the plurality of end user-perceivable indications corresponding to the responses from the various ones of the plurality of RFID tags and the surrogate responses by providing the plurality of end user-perceivable indications as a function of the messages.

12. The apparatus of claim 10 wherein the control circuit is configured to provide the plurality of end user-perceivable indications corresponding to the responses from the various ones of the plurality of RFID tags and the surrogate responses by using a first sound to denote responses from the various ones of the plurality of RFID tags and a second sound that is different from the first sound to denote the surrogate responses.

13. The apparatus of claim 10 wherein the non-responding RFID tags were previously read by at least one different RFID tag reader.

14. The apparatus of claim 10 wherein the end user-perceivable indications are identical to one another.

15. The apparatus of claim 10 wherein the end user-perceivable indications are each no longer than 200 milliseconds in duration.

16. The apparatus of claim 10 wherein the control circuit is configured to provide the plurality of end user-perceivable indications corresponding to the responses from the various ones of the plurality of RFID tags and the surrogate responses by providing the end user-perceivable indications in real-time with respect to when the corresponding responses and the surrogate responses are received.

17. The apparatus of claim 10 wherein the control circuit is configured to provide the plurality of end user-perceivable indications corresponding to the responses from the various ones of the plurality of RFID tags and the surrogate responses by providing the plurality of end user-perceivable indications as a function, at least in part, of filtering less-recent reads to identify relevant more-recent reads.

* * * * *